(12) United States Patent
Gaudreau et al.

(10) Patent No.: US 8,209,938 B2
(45) Date of Patent: Jul. 3, 2012

(54) SIDING AND ROOFING PANEL WITH INTERLOCK SYSTEM

(75) Inventors: Michel Gaudreau, Québec (CA); Louis-André Gaudreau, Lac-Beauport (CA); François Bouchard, Saint-Rédempteur (CA); Mathieu Piché, Québec (CA); Martin Forget, Saint-Romuald (CA)

(73) Assignee: Novik, Inc., Saint-Augustin-de-Desmaures, Quebec (CA)

( * ) Notice: Subject to any disclaimer, the term of this patent is extended or adjusted under 35 U.S.C. 154(b) by 139 days.

(21) Appl. No.: 12/719,099

(22) Filed: Mar. 8, 2010

(65) Prior Publication Data
US 2011/0214375 A1   Sep. 8, 2011

(51) Int. Cl.
*E04F 13/00* (2006.01)
*E04F 21/00* (2006.01)
*E04D 1/00* (2006.01)
*E04D 15/00* (2006.01)

(52) U.S. Cl. ......... 52/749.12; 52/311.1; 52/522; 52/521
(58) Field of Classification Search ................. 52/302.1, 52/302.3, 519, 520, 518, 521, 522, 533, 539, 52/311.1, 311.2, 313, 314; 264/219; 425/542
See application file for complete search history.

(56) References Cited

U.S. PATENT DOCUMENTS

| | | | |
|---|---|---|---|
| 448,733 A | 3/1891 | Sagendorph | |
| 1,447,561 A | 3/1923 | Overbury | |
| 1,467,510 A | 9/1923 | Smith, Jr. | |
| 1,701,704 A | 2/1929 | Stinson | |
| 1,767,374 A | 6/1930 | Kirschbraun | |
| 1,795,913 A | 3/1931 | Weaver | |
| 2,096,968 A | 10/1937 | Johnston | |
| 2,156,277 A | 5/1939 | Corbin, Jr. | |
| 2,766,861 A * | 10/1956 | Abramson | 52/531 |
| 3,417,531 A * | 12/1968 | Jones | 52/520 |
| 3,430,395 A | 3/1969 | Lashkow | |
| 3,504,467 A | 4/1970 | Hatch | |
| 3,754,366 A | 8/1973 | Jansson et al. | |
| 3,783,570 A | 1/1974 | Storch | |
| 3,973,369 A | 8/1976 | Smith | |
| 3,977,145 A | 8/1976 | Dobby | |
| 4,015,391 A | 4/1977 | Epstein | |
| 4,033,499 A | 7/1977 | Butler | |
| 4,034,528 A | 7/1977 | Sanders et al. | |
| 4,070,432 A | 1/1978 | Tamaddon | |

(Continued)

OTHER PUBLICATIONS http://www.ecostar.carlisle.com/PDFs/majestic-install-guide.pdf, Copyright 2005.

*Primary Examiner* — Mark Wendell
(74) *Attorney, Agent, or Firm* — Sutherland Asbill & Brennan LLP

(57) ABSTRACT

A wall or roof covering for mounting on a support surface includes a plurality of panels securable to the support surface. Each panel has a front surface including a covering section with simulated building elements, an opposed rear surface facing the support surface when secured thereto, an upper marginal edge region and an opposed lower marginal edge region overlying the upper marginal edge region of a vertically-adjacent panel. One of the upper marginal edge region and the lower marginal edge region has an inclined receiving slot defined therein, the other one of the upper marginal edge region and the lower marginal edge region has an inclined insertable flange engageable in the inclined receiving slot of the vertically-adjacent panel.

24 Claims, 10 Drawing Sheets

U.S. PATENT DOCUMENTS

| | | | |
|---|---|---|---|
| 4,070,843 A | 1/1978 | Leggiere et al. | |
| 4,096,679 A | 6/1978 | Naz | |
| 4,104,841 A | 8/1978 | Naz | |
| 4,186,538 A | 2/1980 | Marcum, Jr. | |
| 4,189,878 A | 2/1980 | Fitzgerald et al. | |
| 4,219,981 A | 9/1980 | Stewart et al. | |
| 4,251,967 A | 2/1981 | Hoofe, III | |
| 4,288,959 A | 9/1981 | Murdock | |
| 4,310,370 A * | 1/1982 | Arai et al. | 156/220 |
| 4,319,439 A | 3/1982 | Gussow | |
| 4,343,126 A | 8/1982 | Hoofe, III | |
| 4,382,993 A | 5/1983 | McIntyre et al. | |
| 4,434,200 A | 2/1984 | Fash et al. | |
| 4,437,602 A | 3/1984 | Kaczmarek | |
| 4,445,301 A | 5/1984 | Tanski | |
| 4,472,913 A | 9/1984 | Hickman | |
| 4,476,661 A | 10/1984 | Hoofe, III | |
| 4,498,267 A | 2/1985 | Beck | |
| 4,499,702 A | 2/1985 | Turner | |
| 4,522,002 A | 6/1985 | Davis | |
| 4,544,595 A | 10/1985 | Tomasson | |
| 4,580,383 A | 4/1986 | Pittman et al. | |
| 4,588,634 A | 5/1986 | Pagen et al. | |
| 4,592,185 A | 6/1986 | Lynch et al. | |
| 4,593,512 A | 6/1986 | Funaki | |
| 4,598,522 A | 7/1986 | Hoofe, III | |
| 4,617,770 A | 10/1986 | Hickman | |
| 4,617,774 A | 10/1986 | Pittman et al. | |
| 4,618,440 A | 10/1986 | Steinberg et al. | |
| 4,627,207 A | 12/1986 | Young et al. | |
| 4,641,472 A | 2/1987 | Young et al. | |
| 4,663,373 A | 5/1987 | Ravichandran et al. | |
| 4,671,753 A | 6/1987 | Payne | |
| 4,671,991 A | 6/1987 | Payne | |
| 4,680,911 A | 7/1987 | Davis et al. | |
| 4,712,351 A | 12/1987 | Kasprzak | |
| 4,717,614 A | 1/1988 | Bondoc et al. | |
| 4,729,202 A | 3/1988 | Ferland | |
| 4,749,533 A | 6/1988 | Payne | |
| 4,777,776 A | 10/1988 | Morrell | |
| 4,782,638 A | 11/1988 | Hovind | |
| 4,795,661 A | 1/1989 | Bondoc et al. | |
| 4,798,033 A | 1/1989 | Weidl | |
| 4,803,144 A | 2/1989 | Hosol | |
| 4,825,616 A | 5/1989 | Bondoc et al. | |
| 4,879,333 A | 11/1989 | Frazee | |
| 4,890,432 A | 1/1990 | Shepherd | |
| 4,936,071 A | 6/1990 | Karrfalt | |
| 4,940,844 A | 7/1990 | Blunt | |
| 4,946,992 A | 8/1990 | Falk et al. | |
| 5,039,740 A | 8/1991 | Anderson et al. | |
| 5,047,556 A | 9/1991 | Kohler et al. | |
| 5,060,444 A | 10/1991 | Paquette | |
| 5,072,562 A | 12/1991 | Crick et al. | |
| 5,076,037 A | 12/1991 | Crick | |
| 5,084,506 A | 1/1992 | Faler et al. | |
| 5,088,910 A | 2/1992 | Goforth et al. | |
| 5,096,046 A | 3/1992 | Goforth et al. | |
| 5,100,274 A | 3/1992 | Hasan et al. | |
| 5,106,609 A | 4/1992 | Bolich, Jr. et al. | |
| 5,124,098 A | 6/1992 | Vischer | |
| 5,126,392 A | 6/1992 | Nakashima | |
| 5,135,971 A | 8/1992 | Steiert et al. | |
| 5,141,983 A | 8/1992 | Hasegawa et al. | |
| 5,186,980 A | 2/1993 | Koschitzky | |
| 5,188,895 A | 2/1993 | Nishino | |
| 5,224,318 A | 7/1993 | Kemerer | |
| 5,229,207 A | 7/1993 | Paquette et al. | |
| D339,875 S | 9/1993 | Schutz | |
| 5,249,402 A | 10/1993 | Crick | |
| 5,287,669 A | 2/1994 | Hannah et al. | |
| 5,288,787 A | 2/1994 | Sackmann et al. | |
| 5,295,339 A | 3/1994 | Manner | |
| 5,305,569 A | 4/1994 | Malmquist et al. | |
| 5,305,570 A | 4/1994 | Rodriguez et al. | |
| 5,344,007 A | 9/1994 | Nakamura et al. | |
| 5,347,784 A | 9/1994 | Crick et al. | |
| 5,349,802 A | 9/1994 | Kariniemi | |
| 5,363,623 A | 11/1994 | King | |
| 5,375,491 A | 12/1994 | Hannah et al. | |
| 5,400,558 A | 3/1995 | Hannah et al. | |
| RE34,951 E | 5/1995 | Slosberg et al. | |
| 5,416,151 A | 5/1995 | Tanaka | |
| 5,421,134 A | 6/1995 | Hannah et al. | |
| 5,437,735 A | 8/1995 | Younan et al. | |
| 5,444,954 A | 8/1995 | Anderson | |
| 5,501,056 A | 3/1996 | Hannah et al. | |
| 5,524,412 A | 6/1996 | Corl | |
| 5,537,792 A | 7/1996 | Moliere | |
| 5,575,861 A | 11/1996 | Younan et al. | |
| 5,577,361 A | 11/1996 | Grabek, Jr. et al. | |
| 5,592,799 A | 1/1997 | Reinke | |
| 5,613,337 A | 3/1997 | Plath et al. | |
| 5,622,020 A | 4/1997 | Wood | |
| 5,636,481 A | 6/1997 | De Zen | |
| 5,644,886 A * | 7/1997 | Ekmark et al. | 52/518 |
| 5,675,955 A | 10/1997 | Champagne | |
| 5,687,090 A | 11/1997 | Chen et al. | |
| 5,731,033 A | 3/1998 | Hanisco | |
| 5,763,083 A | 6/1998 | Berrigan | |
| 5,784,848 A | 7/1998 | Toscano | |
| 5,813,184 A | 9/1998 | McKenna | |
| 5,821,294 A | 10/1998 | Perlinski | |
| 5,853,858 A | 12/1998 | Bondoc | |
| 5,878,543 A * | 3/1999 | Mowery | 52/519 |
| 5,916,100 A * | 6/1999 | Mitchell et al. | 52/235 |
| 5,922,116 A | 7/1999 | Mistry et al. | |
| 5,922,379 A | 7/1999 | Wang | |
| 5,956,914 A | 9/1999 | Williamson | |
| 5,960,596 A | 10/1999 | Lyons, Sr. | |
| 6,038,827 A | 3/2000 | Sieling | |
| 6,044,609 A | 4/2000 | Kim | |
| 6,050,041 A | 4/2000 | Mowery et al. | |
| 6,052,961 A * | 4/2000 | Gibbs | 52/518 |
| 6,058,670 A | 5/2000 | Sieling | |
| 6,082,064 A * | 7/2000 | Mitchell et al. | 52/235 |
| 6,092,302 A | 7/2000 | Berrigan | |
| 6,105,329 A | 8/2000 | Bondoc et al. | |
| 6,114,007 A | 9/2000 | Brandon et al. | |
| 6,122,878 A | 9/2000 | Pliley | |
| 6,153,293 A | 11/2000 | Dahl et al. | |
| 6,180,257 B1 | 1/2001 | Brandt et al. | |
| 6,224,701 B1 | 5/2001 | Bryant et al. | |
| 6,248,813 B1 | 6/2001 | Zehner | |
| 6,258,876 B1 | 7/2001 | Medoff et al. | |
| 6,282,858 B1 | 9/2001 | Swick | |
| 6,295,777 B1 * | 10/2001 | Hunter et al. | 52/519 |
| 6,301,856 B1 | 10/2001 | Nasi | |
| 6,336,303 B1 | 1/2002 | Vandeman et al. | |
| 6,360,508 B1 | 3/2002 | Pelfrey et al. | |
| 6,361,851 B1 | 3/2002 | Sieling et al. | |
| 6,421,975 B2 * | 7/2002 | Bryant et al. | 52/528 |
| 6,436,471 B1 | 8/2002 | Petersen | |
| 6,487,828 B1 | 12/2002 | Phillips | |
| 6,550,362 B1 | 4/2003 | Galinat et al. | |
| 6,579,605 B2 | 6/2003 | Zehner | |
| 6,715,240 B2 | 4/2004 | Beck et al. | |
| 6,715,250 B2 * | 4/2004 | Bryant et al. | 52/528 |
| 6,786,804 B2 | 9/2004 | Watanabe | |
| D507,837 S * | 7/2005 | King | D25/141 |
| 6,939,036 B2 | 9/2005 | Beck et al. | |
| 6,955,019 B2 * | 10/2005 | Donlin et al. | 52/520 |
| 6,976,342 B1 | 12/2005 | Kowalevich | |
| 6,983,571 B2 | 1/2006 | Felton | |
| 6,988,345 B1 | 1/2006 | Pelfrey et al. | |
| 7,089,709 B2 | 8/2006 | Waggoner | |
| 7,207,145 B2 | 4/2007 | Stucky et al. | |
| 7,240,461 B1 | 7/2007 | Vandeman et al. | |
| 7,698,865 B2 * | 4/2010 | Pringle et al. | 52/520 |
| 7,739,848 B2 * | 6/2010 | Trout | 52/581 |
| 7,775,008 B2 * | 8/2010 | King | 52/519 |
| 7,775,009 B2 * | 8/2010 | King | 52/520 |
| 2001/0039778 A1 | 11/2001 | King | |
| 2002/0026758 A1 * | 3/2002 | Mitchell | 52/235 |
| 2002/0098110 A1 | 7/2002 | Graham et al. | |
| 2003/0182888 A1 | 10/2003 | Desbois et al. | |
| 2005/0072093 A1 * | 4/2005 | King | 52/522 |

| | | | | | |
|---|---|---|---|---|---|
| 2005/0102946 A1* | 5/2005 | Stucky et al. ............... 52/518 | 2008/0083186 A1 | 4/2008 | Gaudreau |
| 2006/0032527 A1 | 2/2006 | Stevens et al. | 2008/0098683 A1 | 5/2008 | Trabue et al. |
| 2007/0107356 A1 | 5/2007 | Steffes et al. | 2010/0088988 A1 | 4/2010 | Gaudreau |
| 2007/0144096 A1 | 6/2007 | O'Neal | | | |

* cited by examiner

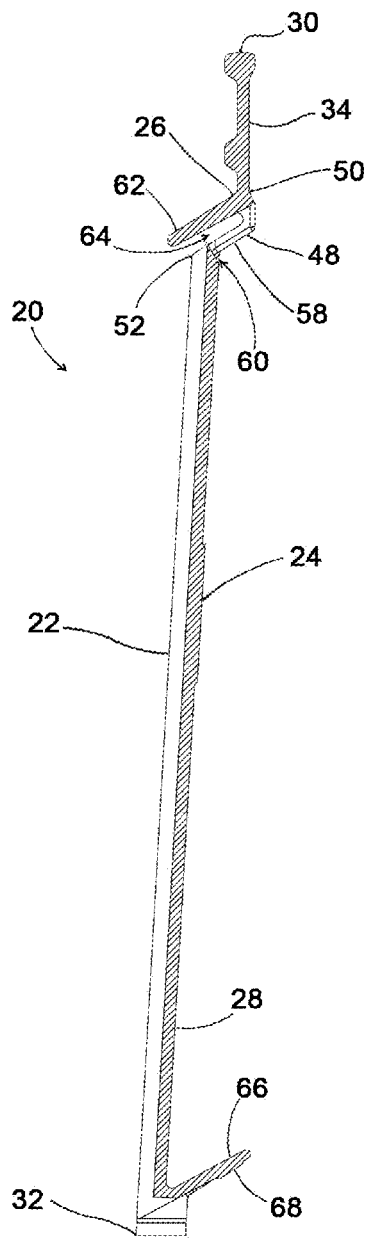
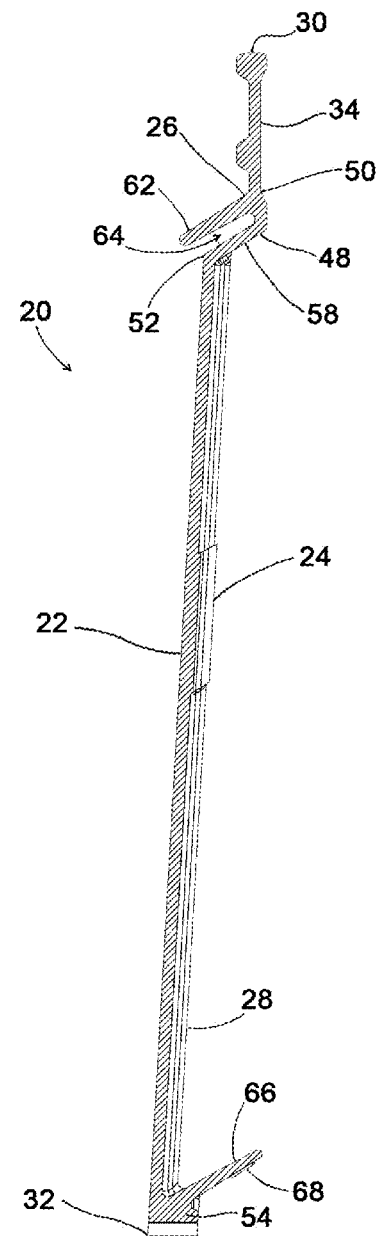
COUPE A-A
FIG.6
COUPE B-B
FIG.7

DÉTAIL C

SIDING AND ROOFING PANEL WITH INTERLOCK SYSTEM

TECHNICAL FIELD OF THE INVENTION

The technical field relates to roofing and siding panels which are intended for roof and wall coverings and include simulated building elements, and more particularly, to roofing and siding panels engageable with like panels disposed vertically adjacent thereto.

BACKGROUND

Siding and roofing coverings made of synthetic materials for facing exterior building walls and roofs are known. They can have the appearance of wooden clapboards, cedar shakes, masonry such as stones and bricks, and the like. The coverings include elongated panels which are individually nailed or screwed to building walls or roofs, i.e. to support surfaces. These panels are commonly nailed to the support surface in horizontal courses, beginning with the lowermost course. Typically, an upper marginal edge region of the panels is provided with a plurality of longitudinally-spaced outwardly and downwardly directed interlocked hook-shaped fingers protruding from a front surface and a lower marginal edge region of the panels is provided with a bottom upturned hook-shaped rail formed on the underside of the panel, as disclosed in U.S. patent application 2008/0098683. The interlocked fingers of an underlying panel are engaged with the bottom rail of an overlying panel.

However, due to the size of the panels, the installer may have difficulty to engage all the interlocked fingers with the rail. Furthermore, the engagement of the fingers and the rail does not secure the overlying panel to the underlying panel and it can be difficult for the installer to hold and maintain a panel and simultaneously secure it to the support surface.

BRIEF SUMMARY OF THE INVENTION

It is therefore an aim of the present invention to address the above mentioned issues.

According to a general aspect, there is provided a wall or roof covering for mounting on a support surface, comprising: a plurality of panels securable to the support surface, each having a front surface including a covering section with simulated building elements, an opposed rear surface facing the support surface when secured thereto, an upper marginal edge region and an opposed lower marginal edge region overlying the upper marginal edge region of a vertically-adjacent panel, one of the upper marginal edge region and the lower marginal edge region having an inclined receiving slot defined therein, the other one of the upper marginal edge region and the lower marginal edge region having an inclined insertable flange engageable in the inclined receiving slot of the vertically-adjacent panel.

In an embodiment, each one of the panels comprises an inclined wall flange defining the inclined receiving slot and extending outwardly and downwardly from the front surface in the upper marginal edge region and the inclined insertable flange extends outwardly and upwardly from the rear surface in the lower marginal edge region.

In an embodiment, the inclined flange and the inclined slot are continuous along a length of each one of the panels.

The upper marginal edge region of each one of the panels can comprise a fastening strip juxtaposable to the support surface and the covering section being spaced apart from the support surface when the panel is mounted to the support surface, the covering section and the fastening strip being connected through an inclined connecting wall extending substantially parallel to one of the inclined insertable flange and the inclined receiving slot.

The inclined connecting wall can be discontinuous along a length of each one of the panels and comprises spaced-apart inclined wall sections extending from an upper edge of the covering section to a lower edge of the fastening strip, and interlocking ledges extending between two longitudinally-adjacent inclined wall sections.

In an embodiment, the lower marginal edge region comprises a lower ledge extending rearwardly from a lower edge of the covering section, each one of the panels comprises an inclined wall flange defining the inclined receiving slot, and one of the inclined wall flange and the inclined insertable flange extends upwardly and rearwardly from the junction of the rear face and the lower ledge.

In an embodiment, the inclined receiving slot has a width which corresponds substantially to a thickness of the inclined insertable flange.

In an embodiment, the inclined receiving slot and the inclined insertable flange extend at an angle ranging between 5 and 85 degrees with the support surface when mounted thereto in complementary orientations.

According to another general aspect, there is provided a wall or roof covering panel for mounting on a support surface, comprising: a front surface including a covering section with simulated building elements; an opposed rear surface facing the support surface when secured thereto; an upper marginal edge region and an opposed lower marginal edge region overlying the upper marginal edge region of a vertically-adjacent panel, the upper marginal edge region having a protruding and inclined flange extending outwardly and downwardly from the front surface and the lower marginal edge region having a protruding and inclined flange extending outwardly and upwardly from the rear surface, one of the upper marginal edge region and the lower marginal edge region having an inclined wall extending parallel to the protruding and inclined flange and defining therewith an inclined receiving slot, the protruding and inclined flange of the other one of the upper marginal edge region and the lower marginal edge region being engageable in the inclined receiving slot of the vertically-adjacent panel.

In an embodiment, the inclined flange and the inclined receiving slot are continuous along a length of the panel.

The upper marginal edge region of the panel can comprise a fastening strip juxtaposable to the support surface and the covering section being spaced apart from the support surface when the panel is mounted to the support surface, the covering section and the fastening strip being connected through an inclined connecting wall extending substantially parallel to the inclined flange of the upper marginal edge region.

In an embodiment, the inclined connecting wall can be discontinuous along a length of the panel and comprises spaced-apart inclined wall sections extending from an upper edge of the covering section to a lower edge of the fastening strip, and interlocking ledges extending between two longitudinally-adjacent inclined wall sections.

In an embodiment, the inclined receiving slot has a width which corresponds substantially to a thickness of the inclined flange insertable therein.

In an embodiment, the inclined receiving slot and the inclined flange insertable therein extend at an angle ranging between 5 and 85 degrees with the support surface when mounted thereto in complementary orientations.

According to still another general aspect, there is provided a wall or roof covering for mounting on a support surface, comprising: a plurality of panels securable to the support surface, each having a front surface including a covering section with simulated building elements, an opposed rear surface facing the support surface when secured thereto, an upper marginal edge region and an opposed lower marginal edge region overlying the upper marginal edge region of a vertically-adjacent panel, the upper marginal edge region having a protruding flange extending outwardly and downwardly from the front surface and the lower marginal edge region having a protruding flange extending outwardly and upwardly from the rear surface, one of the upper marginal edge region and the lower marginal edge region having a longitudinally extending wall including longitudinally spaced apart wall sections and interlocking ledges extending between two longitudinally-adjacent wall sections, the longitudinally spaced apart wall sections extending parallel to the protruding flange of the same edge region and defining therewith a receiving slot, the protruding flange of the other one of the upper marginal edge region and the lower marginal edge region being engageable in the receiving slot of the vertically-adjacent panel and having at least one protuberance abutting at least one of the interlocking ledges of the vertically-adjacent panel upon engagement of one of the protruding flange in the receiving slot of the vertically-adjacent panel and securing overlying upper and lower marginal edge regions of vertically adjacent panels.

The at least one protuberance can be wedge-shaped and can be located on the protruding flange located in the lower marginal edge region and the at least one protuberance is located in the upper marginal edge region.

According to a further general aspect, there is provided a method for manufacturing a wall or roof covering panel having a simulated building elements on a surface thereon for mounting on a support surface, the method comprising: mechanically creating a first pattern in a mold which corresponds to a first texture; chemically creating a second pattern in a mold which corresponds to a second texture; molding the covering panel in the mold including the first and the second patterns to obtain the covering panel having the first texture and the second texture, wherein at least a section of the first and the second patterns are superposed to one another.

In an embodiment, the first texture comprises coarse components and the second texture comprises refined components.

The first pattern can be created in the mold before the second pattern and it can be created by at least one of a machining process and an electroerosion process.

Chemically creating the second pattern can comprise applying a protection pattern over the mold, and dipping the mold in an acid bath.

In an embodiment, the mold comprises an injection mold and the covering panel is molded by an injection molding process.

According to another general aspect, there is provided a mold for manufacturing wall or roof covering panels having a simulated building elements on a surface thereon, the mold comprising: a mechanically created pattern which corresponds to a first texture and a chemically created pattern which corresponds to a second texture, wherein at least a section of the first and the second patterns are superposed to one another.

BRIEF DESCRIPTION OF THE DRAWINGS

FIG. 6 is a sectional view taken along cross-section lines A-A of FIG. 4;

FIG. 7 is a sectional view taken along cross-section lines B-B of FIG. 4;

It will be noted that throughout the appended drawings, like features are identified by like reference numerals.

DETAILED DESCRIPTION

Figure 1:
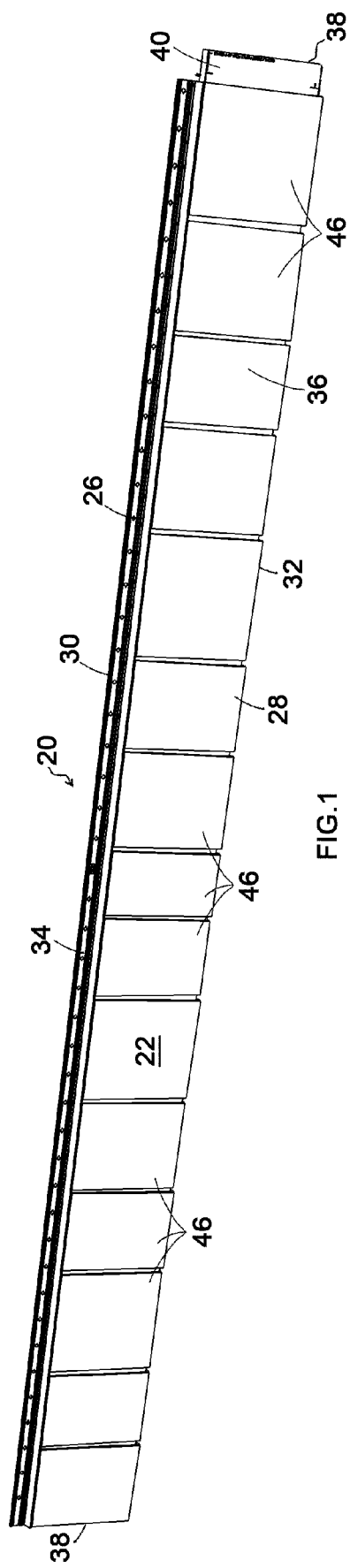
FIG. 1 is a perspective view of a panel for a covering system in accordance with an embodiment.
Figure 2:
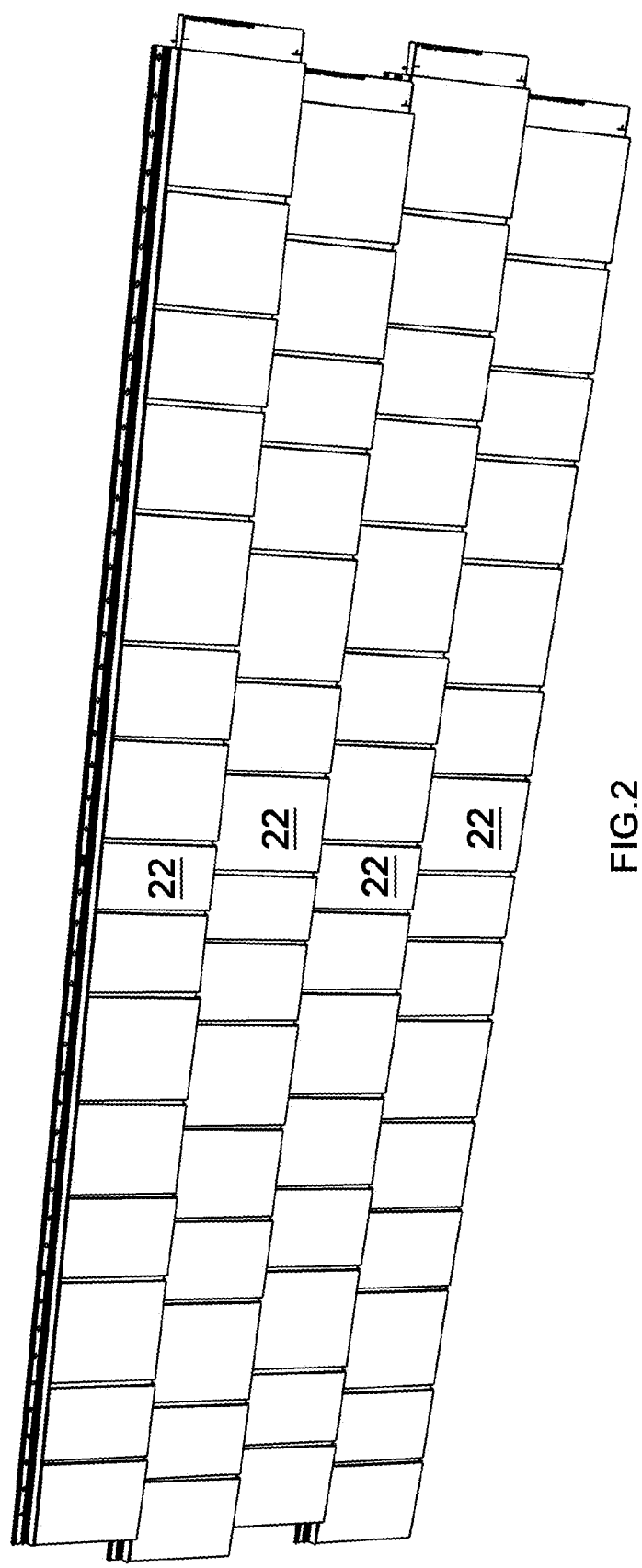
FIG. 2 is a perspective view of the panels shown in FIG. 1 positioned in a vertically-adjacent relationship.

Referring to FIGS. 1 and 2, there is shown panels 20 for a covering system for substantially flat support surfaces such as building structure walls and roofs (not shown). The covering system includes a plurality of panels 20 adapted for engagement with like panels positioned vertically and horizontally adjacent thereto. The panels 20 of the covering system are typically mounted in horizontal courses to the support surface.

Figure 3:
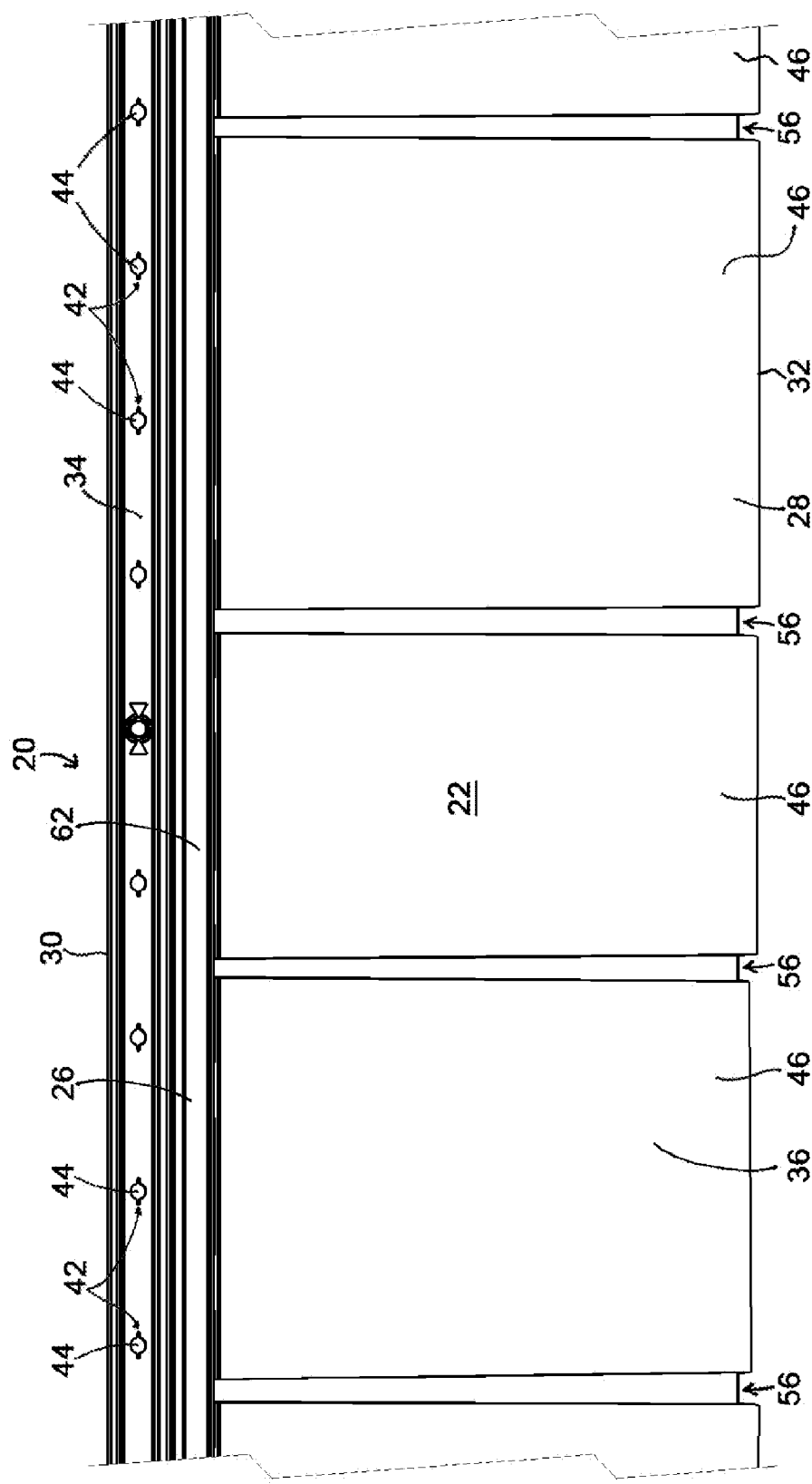
FIG. 3 is a front view, enlarged and fragmented, of the panel shown in FIG. 1.
Figure 4:
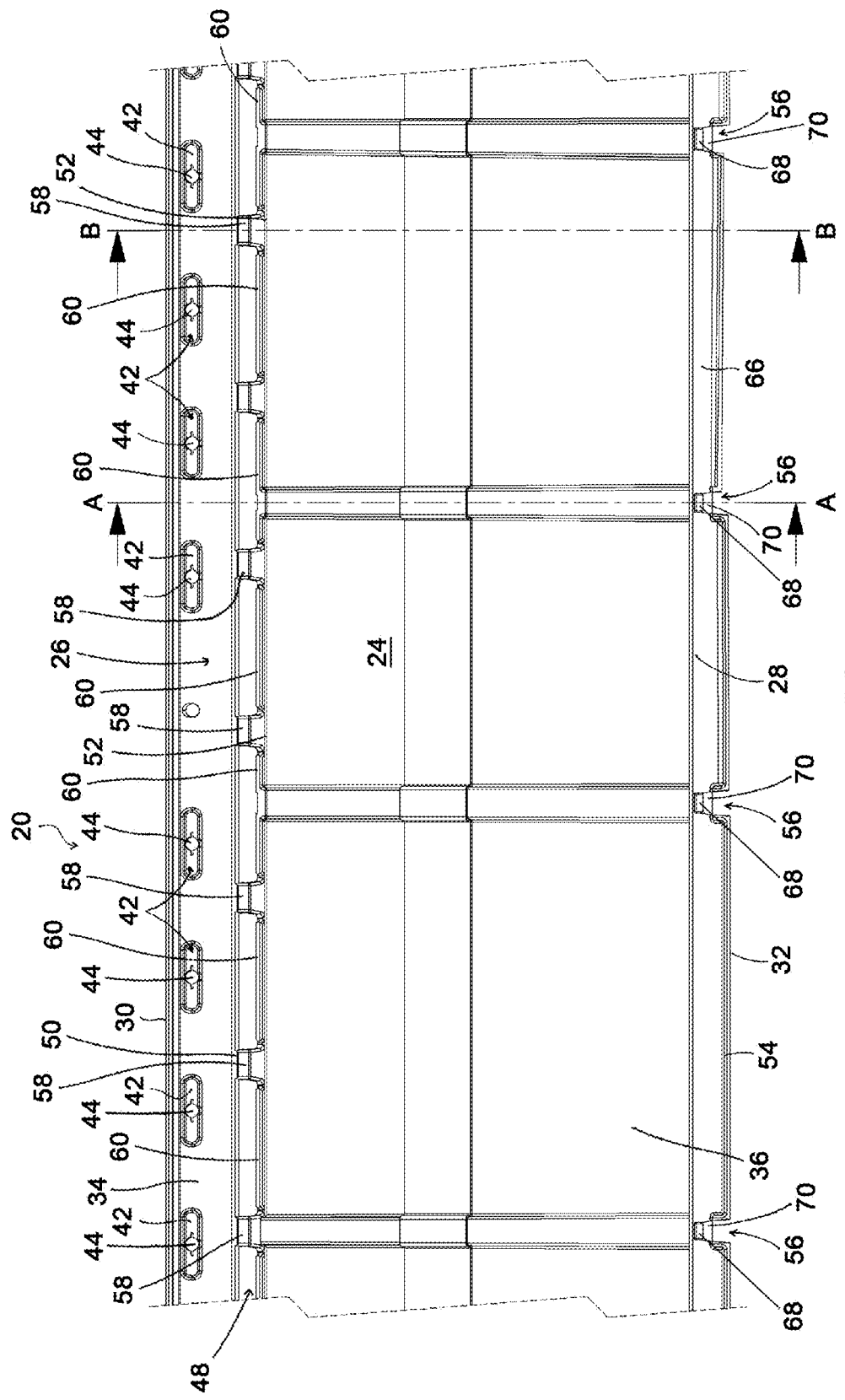
FIG. 4 is a rear view, enlarged and fragmented, of the panel shown in FIG. 1.
Figure 5:
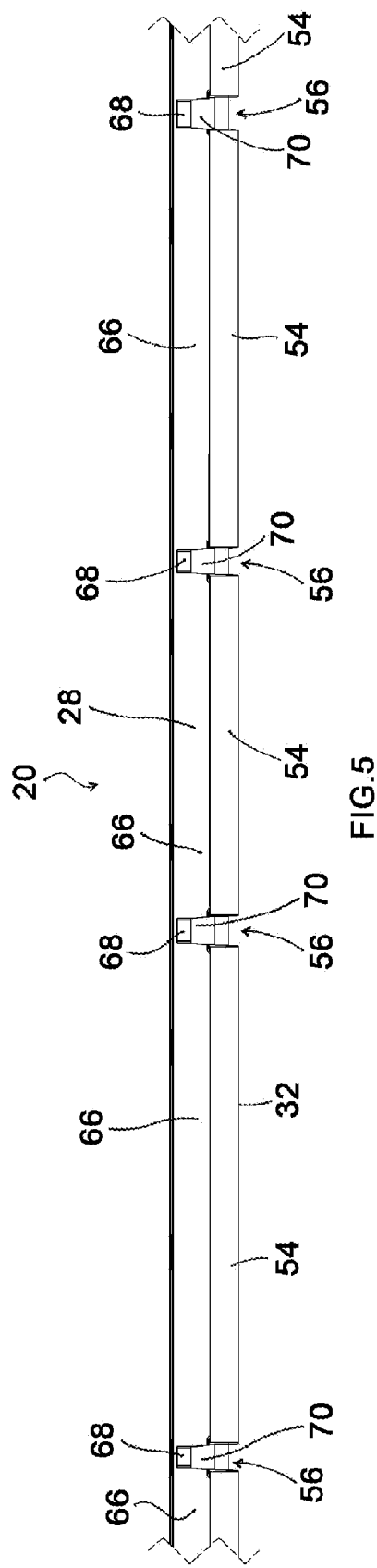
FIG. 5 is a bottom view, enlarged and fragmented, of the panel shown in FIG. 1.
Figure 8:
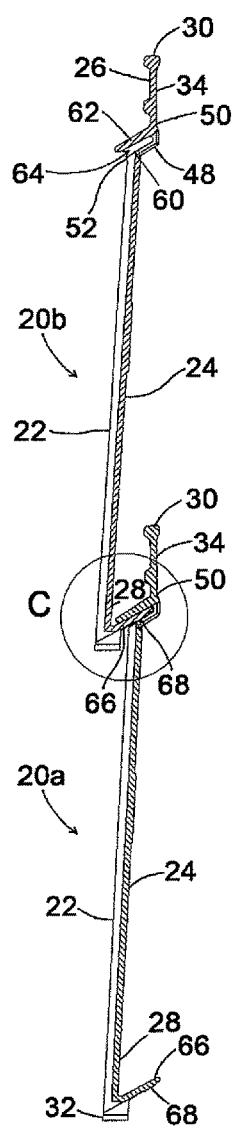
FIG. 8 is a sectional view taken along cross-section lines C-C of FIG. 2.
Figure 9:
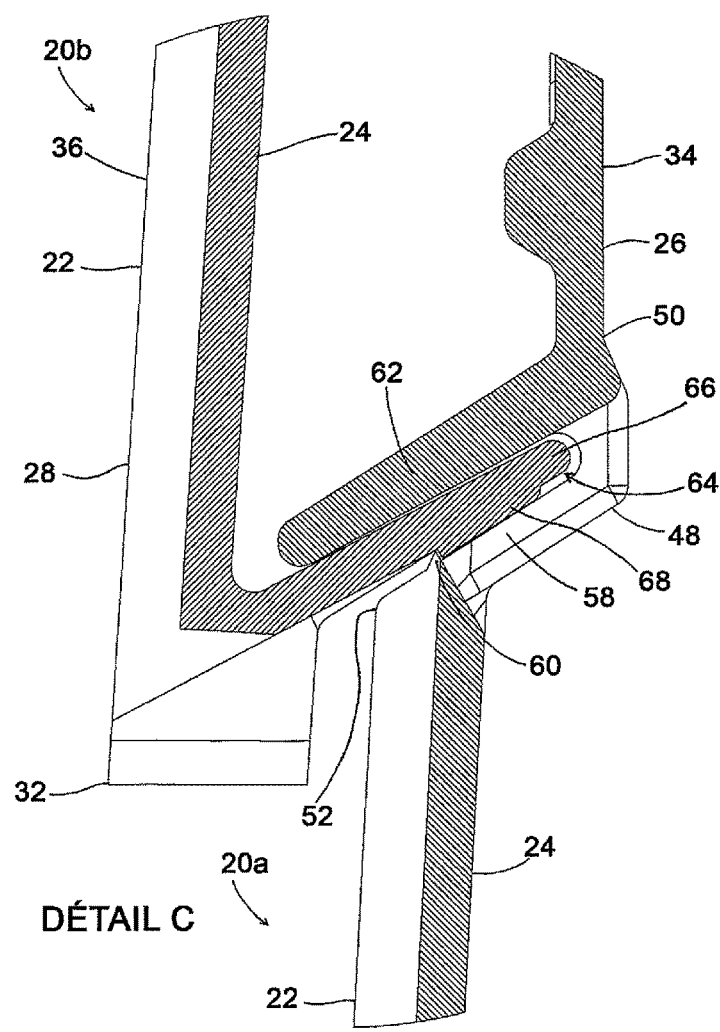
FIG. 9 is an enlarged view of detail D of FIG. 8 showing the connection between two vertically-adjacent panels.

Turning to FIGS. 3 and 4, there is shown that each panel 20 is characterized by a front surface 22 and an opposed rear surface 24. The rear surface 24 faces the support surface when the panel 20 is mounted thereto. The panel 20 includes an upper marginal edge region 26 and an opposed lower marginal edge region 28 with respective upper and lower edges 30, 32. The upper marginal edge region 26 has a substantially uniform width extending across the top of the panel 20 and includes a fastening strip 34. A covering section 36 extends below the upper marginal edge region 26. The lower marginal edge region 28 overlies the upper marginal edge region 26 of a vertically-adjacent panel 20 when the panels 20 are mounted to the support surface. The panel 20 also includes opposite lateral edges 38 and a lateral flange 40. The lateral flange 40 is overlied by the opposite lateral edge region of a horizontally-adjacent panel 20.

For securing the panels 20 to the support surface, the upper marginal edge region 26 of each panel 20 includes a row of spaced-apart elongated grooves 42 including a substantially centered nailing hole 44. Nails or other appropriate fasteners are inserted in the nailing holes for securing the panels 20 to the support surface.

As mentioned above, the panels 20 are typically mounted in horizontal courses to the support surface, beginning with the lowermost course to be installed on the support surface, with the lateral flange 40 in underlying relation to the opposed lateral edge region of the horizontally-adjacent panel 20 and with the lower marginal edge region 28 of the panels 20 in each course overlying the upper marginal edge region 26 in the previously mounted and vertically-adjacent course.

On the front surface 22 of the panel 20, the covering section 36 includes simulated building elements 46. In the embodiment shown, the building elements 46 include a single horizontally extending row of shingles, such as cedar shake shingles. It is appreciated that, in alternative embodiments (not shown), the building elements 46 can include a plurality of vertically adjacent, horizontally extending rows of shingles or other building elements. It is appreciated that the rows can be staggered relative to a preceding row or not. Furthermore, the covering section 36 can simulate any other types of building elements such as wood planks, slates, tiles, bricks, stones, and the like. In FIGS. 1 to 9, the texture of the building elements has been removed.

In the embodiment shown, the building elements 46 extend downwardly and outwardly at a slight taper to the support surface upon which the panel 20 is mounted. An inclined connecting wall 48 connects a lower edge 50 of the fastening strip 34 and an upper edge 52 of the covering section 36 of the panel 20, i.e. the connecting wall 48 extends downwardly and outwardly (or forwardly) from the upper marginal edge region 26 when mounted to the support surface and defines an angle ranging between about 5 degrees and 85 degrees with the support surface when mounted thereto. In an embodiment, the angle ranges between about 15 degrees and 70 degrees and, in an alternative embodiment, the angle ranges between about 30 degrees and 65 degrees.

In the embodiment shown, each building element 46 and, more particularly each simulated shingle, has a lower ledge 54 extending rearwardly from the lower edge 32 thereof. The lower ledges 54 of adjacent building elements 46 are spaced-apart from one another with indentations 56 extending therebetween. The indentations 56 simulate a lower edge of a rearwardly mounted shingle.

The inclined connecting wall 48 is discontinuous along the panel length and, more particularly, it includes a plurality of longitudinally spaced-apart inclined wall sections 58 and interlocking ledges 60 extending between two adjacent longitudinally spaced-apart inclined wall sections 58. Thus, the longitudinally spaced-apart inclined wall sections 58 connect the lower edge 50 of the fastening strip 34 and the upper edge 52 of the covering section 36 while the interlocking ledges 60 define discontinuities between the upper marginal edge region 26 and the covering section 36. Thus, the interlocking ledges 60 are shorter in length than the wall sections 58 and extend upwardly and rearwardly from the upper edge 52 of the covering section 36. The interlocking ledges 60 define substantially the same angle with the support surface than the wall sections 58, i.e. they extend substantially parallel to one another.

The panels 20 have interlocking features that enable inter-engagement of overlying upper and lower marginal edge regions 26, 28 during installation. As it will be described in more details below, the inter-engagement of vertically-adjacent panels 20 facilitates handling of the overlying panel 20 while being secured to the support surface.

The upper marginal edge region 26 of the panel 20 includes an inclined flange 62 protruding outwardly (forwardly) and downwardly from the front surface 22. The inclined flange (or protruding flange) 62 extends continuously along the length of the panel 20. The inclined flange 62 extends parallel and above the inclined connecting wall 48, extending above the covering section 36. The inclined flange 62 defines an angle ranging between about 5 degrees and 85 degrees with the support surface when mounted thereto. In an embodiment, the angle ranges between about 15 degrees and 70 degrees and, in an alternative embodiment, the angle ranges between about 30 degrees and 65 degrees.

The inclined flange 62 and the inclined connecting wall 48 are spaced-apart from one another and define an inclined receiving slot 64 therebetween. As for the inclined flange 62, the inclined receiving slot 64 extends continuously along the length of the panel 20. The inclined receiving slot 64 is substantially flat, i.e. it extends in a single inclined plane relatively to the support surface.

The lower marginal edge region 28 also includes an inclined insertable flange 66 which protrudes outwardly (rearwardly) and upwardly from the rear surface 24, extending continuously along the length of the panel 20. In the embodiment shown, the inclined insertable flange 66 extends outwardly (rearwardly) and upwardly from about a lower edge 52 of the covering section 36 of the panel 20. The inclined insertable flange 66 is substantially flat, i.e. it extends in a single inclined plane relatively to the support surface. In the embodiment shown, the inclined insertable flange 66 extends from the intersection of the lower edge 52 of the covering section 36 and the lower ledge 54, which also corresponds to the lower edge 32 of the indentation 56. The angle of the inclined flanges 62, 66 in the upper and lower marginal edge regions 26, 28 with the support surface when the panel 20 is mounted thereto are substantially similar, but in the complementary orientation. The inclined insertable flange 66 defines an angle ranging between about 5 degrees and 85 degrees with the support surface when mounted thereto. In an embodiment, the angle ranges between about 15 degrees and 70 degrees and, in an alternative embodiment, the angle ranges between about 30 degrees and 65 degrees.

To clarify the relative position and order of installation of the panels 20, when discussing the interaction of panels 20 mounted in vertically displaced courses, the panels 20 of the lowermost course will be designated with the letter "a" following the reference numeral and the panels 20 of the subsequent courses will be designated with the letter "b", "c", etc.

The inclined insertable flange 66 of the lower marginal edge region 28 of an upper course panel 20b is designed to be insertable in the inclined receiving slot 64 of an underlying panel 20a previously mounted to the support surface. The vertically-adjacent panels 20a, 20b are continuously engaged together since the inclined receiving slot 64 and the inclined insertable flange 66 extend continuously along the length of the panels 20a, 20b. The thickness of the inclined flange 62 substantially corresponds to the width of the inclined receiving slot 64 to facilitate frictional retention. Thus, during installation, the vertically-adjacent panels 20a, 20b are first engaged together by inserting the inclined insertable flange 66 of the upper panel 20b in the inclined receiving slot 64 of the lower panel 20a, previously secured to the support surface. Following engagement, the upper panel 20b can be secured to the support surface by inserting nails or other fasteners in the upper marginal edge region 26 and, more particularly, in the nailing holes 44. Due to the frictional retention of the inclined flange 66 in the inclined receiving slot 64, the overlying panel 20b is supported and it can be secured to the support surface without the need for manually support the weight of the panel 20b.

The inclined flange 66 of the lower marginal edge region 28 further includes a plurality of spaced-apart protuberances 68. In the embodiment shown, the protuberances 68 are aligned with the indentations 56 to facilitate panel molding and located on the surface facing downwardly when the panel 20 is mounted to the support surface, i.e. the outer surface. In the embodiment shown, a depression 70 is defined in the flange 66 between the protuberance 68 and the proximal end of flange 66. The width of the depressions 70 substantially corresponds to the width of the protuberances 68 and/or the width of the indentations 56. When the inclined insertable flange 66 of the upper panel 20*b* is inserted in the inclined receiving slot 64 of the lower panel 20*a*, several of the inclined flange protuberances 68, which are also inserted in the inclined receiving slot 64, abut the interlocking ledges 60. The abutting engagement of the protuberances 68 and the interlocking ledges 60 prevents disengagement of the overlying panel 20*b* from the underlying panel 20*a*. To facilitate the engagement, as it will be described in more details below, the protuberances 68 are wedge shaped, i.e. they are thinner close to a distal end of the flange 66 and with a progressively increasing thickness towards the proximal end. The thicker protuberance edge abuts the interlocking ledges 60 when engaged together. Thus, the combination of the protuberances 68 and the interlocking ledges 60 supports the overlying panel 20*b* during securement of the latter to the support surface.

When the inclined insertable flange 66 of the upper panel 20*b* is inserted in the inclined receiving slot 64 of the lower panel 20*a*, few protuberances 68 may be aligned or have a portion aligned with a respective one of the longitudinally spaced-apart inclined wall sections 58. Other protuberances 68 may be abutting a respective one of the longitudinally spaced-apart inclined wall sections 58. However, sufficient spacing is provided to accommodate relative movement of the panels 20 during installation and/or usage from temperature expansion and contraction of the panels 20.

It is understood that the reverse arrangement could be used. While in the illustrated embodiment, the inclined insertable flange 66 protrudes from the lower marginal edge region 28 and the inclined receiving slot 64 is located in the upper marginal edge region 26, it will be understood that the reverse arrangement also could be used. More particularly, the lower marginal edge region 28 can include two spaced-apart flanges that defines therebetween the inclined receiving slot and the upper marginal edge region can include the corresponding inclined insertable flange.

The inclination and orientation of the receiving slot 64 and the complementary insertable flange 66 facilitate insertion of the flange 66 inside the slot 64. Furthermore, engagement is also facilitated since they both extend in a single plane. Relative lateral sliding movement of adjacent panels during installation and due to thermal expansion and contraction is allowed since the receiving slot 64 and the complementary insertable flange 66 extend continuously along the panel length.

By providing one of the interlocking component 66 on the rear surface 24 of the lower marginal edge region 28 and the complementary interlocking component 64 located in the upper marginal edge region 26, the interlock arrangement is hidden behind the covering section 26 of the overlying panel 20*b* and does not detract from the natural appearance of the simulated building elements 46.

As mentioned above, the interlocking engagement of vertically-adjacent panels 20*a*, 20*b* is substantially continuous since the inclined receiving slot 64 and the inclined insertable flange 66 extend continuously along the length of the panels 20. This facilitates proper positioning of the overlying panel 20*b* during installation as well as supporting the weight of the panel 20 sufficient to enable the installer to effect its securement on the support surface without cumbersome support of the overlying panel weight.

When mounting the panels 20 to the support surface, the lateral edges 38 of the panel 20 can be stepped to create staggered rows of building elements 46.

In an alternative embodiment, the panel 20 can be lower ledge free and the inclined insertable flange 66 can extend from the lower edge 32 of the panel 20. In an alternative embodiment, the lower ledge 54 can have a different such as, for instance and without being limitative, a upwardly oriented hook. In another alternative embodiment, the lower ledge 54 can be continuous along the panel length.

In an alternative embodiment, the inclined connecting wall 48 can be continuous along the panel length, i.e. it can be free of interlocking ledges 60 which create discontinuities along the inclined connecting wall length.

In an alternative embodiment, the protuberances 68 can be locate inside the receiving slot 64 and the complementary interlocking ledges 60 can be defined by apertures extending through the insertable flange 66, creating discontinuities therein.

In another alternative embodiment, the inclined flange 62 can be discontinuous and have apertures extending therethrough defining the interlocking ledges 60. The engageable protuberances can thus be located on the inner surface of the insertable flange 66.

It is appreciated that the protrusions 68 can be located anywhere along the flange or in the slot. Moreover, the shape of the protrusions 68 can differ from the one shown in the above-described embodiment.

Furthermore, in an embodiment, it is appreciated that the interlocking arrangement can be depression and interlocking ledge free.

In the embodiment shown, the complementary inclined insertable flange and slot cooperate with the protuberances and interlocking ledges. In an alternative embodiment (not shown), the protuberances and interlocking ledges can cooperate with hook shaped interlocking components or any other appropriately shaped interlocking components.

Figure 10:
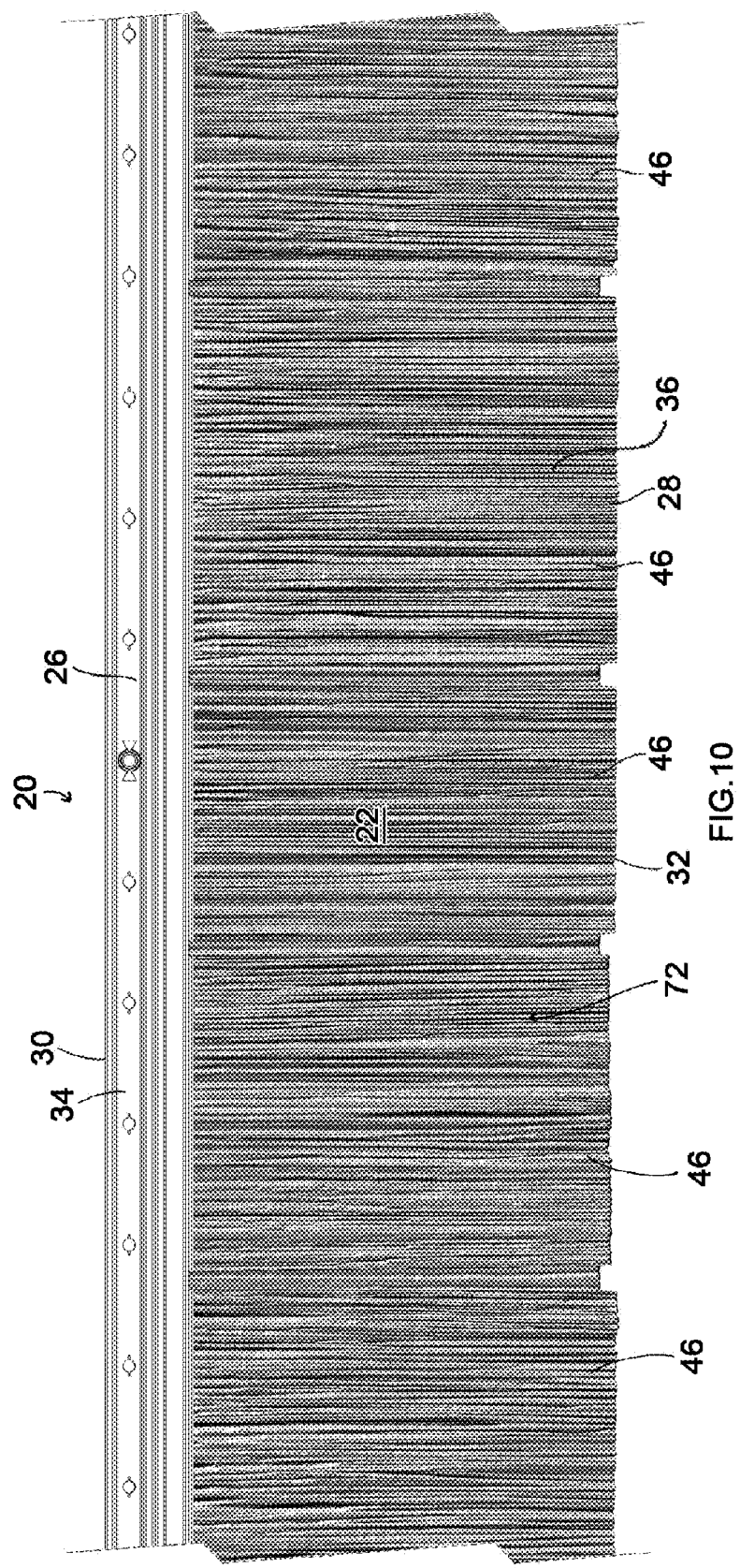
FIG. 10 is a front view, enlarged and fragmented, of the panel shown in FIG. 1 having a mechanically created texture.
Figure 11:
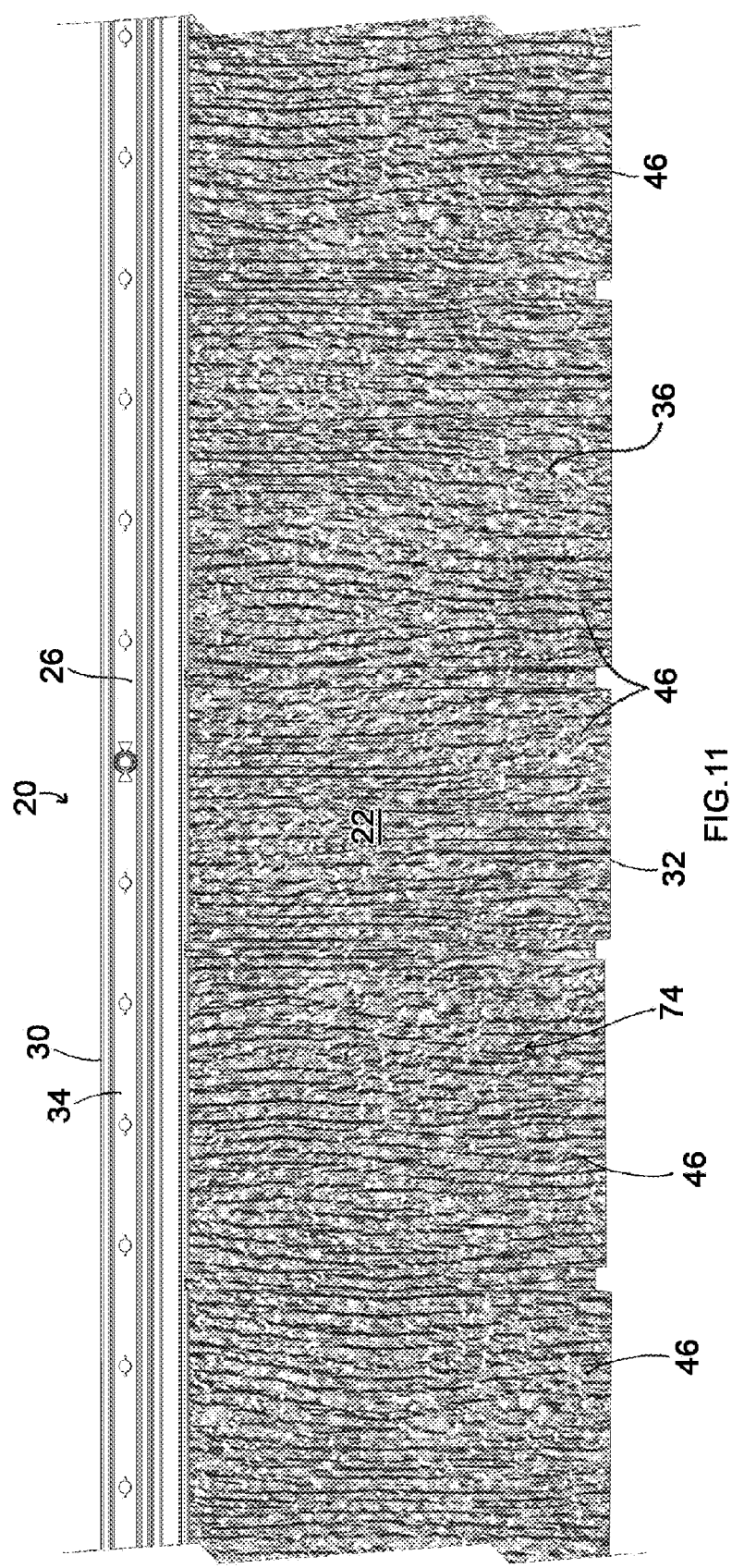
FIG. 11 is a front view, enlarged and fragmented, of the panel shown in FIG. 1 having a chemically created texture.
Figure 12:
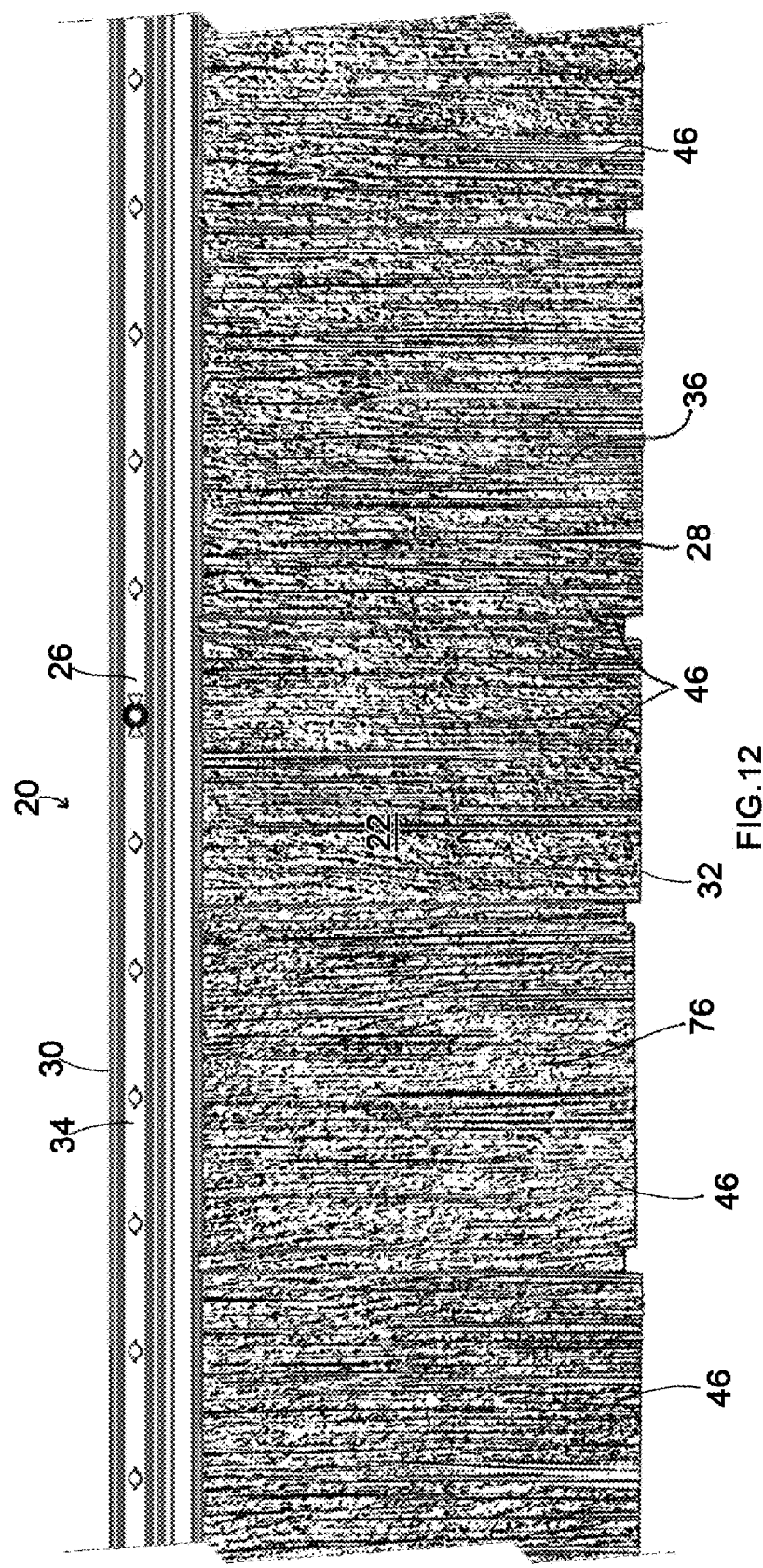
FIG. 12 is a front view, enlarged and fragmented, of the panel shown in FIG. 1 having superposed mechanically and chemically created textures.

Referring now to FIGS. 10 to 12, there is shown the front surface 22 of the panel 20 with the covering section 26. The covering section 26 includes a plurality of simulated building elements 46 in the form of horizontally adjacent cedar shingles. The appearance of the wood texture including the wood grain is obtained by the superposition of two texture defining patterns applied to a panel mold: a mechanical texture defining pattern creating a relatively coarse mechanical texture in the molded product and a chemical texture defining pattern creating a relatively refined chemical texture in the molded product. The chemical and mechanical textures are superposed to one another in the mold and in the resulting molded product, and more particularly the covering panels.

The panels 20 are typically obtained by a polymer molding process, and more particularly an injection molding process. The mechanical and chemical textures are obtained by creating respectively mechanical and chemical patterns in the mold surface corresponding to the covering surface of the panel, as it will be described in more details below.

FIG. 10 shows the covering face 26 with building elements 46 including solely the mechanically created texture. The mechanically created texture is obtained by mechanically creating a pattern in the mold. The mechanically created pattern provides panels having the coarse texture of the wood grain, and more particularly, substantially deep elongated grooves simulating the wood grain of the shingles.

Thus, the pattern is mechanically created in the injection mold to obtain, on the molded panels, the desired texture. The pattern defined in the mold is based on 3D data reproducing the natural texture of the material to simulate, for instance wood shingles. The 3D data can be obtained either by scanning the material to reproduced or from converted 2D images. The mold pattern is created by conventional manufacturing processes such as machining, electroerosion, and the like.

FIG. 11 shows the covering face 26 with building elements 46 including solely the chemically created texture. The chemically created texture is a complementary texture which provides the refined texture of the wood grain, and more particularly, irregular depressions also simulating the wood grain of the shingles.

In an embodiment, to obtain the chemically created texture, a pattern is first printed on a paper with an ink having predetermined properties, and more particularly which is non-attacked by acid. The paper is then applied on the mold over the section corresponding to the panel covering face 26 and the remaining portions of the mold are covered by a protective wrapper. The mold is dipped in an acid bath where the paper ink protects the mold metal. The mold areas covered solely by the paper, i.e. without ink or protective wrapper, are attacked by acid while the protective wrapper and the ink protect the mold from acid. After a predetermined time period, the mold is removed from the acid bath. The resulting mold has irregular protuberances, which correspond to the ink pattern. Thus, the panels molded with the mold having solely a chemically created pattern have a refined wood grain texture comparatively to the wood grain texture obtained by mechanically created pattern.

FIG. 12 shows the covering face 26 with building elements 46 including superposed mechanically and chemically created textures. In an embodiment, the mechanically created pattern corresponding to the mechanically created texture is first machined in the mold while the chemically created texture is superposed to the mechanically created texture. As mentioned above, the mechanically created texture provides the coarse wood grain texture to the simulated building elements 46 while the chemically created texture provides the complementary refined wood grain texture to the simulated building elements 46.

It is appreciated that the superposed mechanically and chemically created textures can be used to reproduced respectively the coarse and the refined textures of other materials such as tiles, slates, bricks, stones, and the like. It is also appreciated that the chemically created texture can be provided first to the injection mold and that the mechanically created texture can be superposed to the chemically created texture.

It is appreciated that, in alternative embodiments (not shown), the building elements 46 can include a plurality of vertically adjacent, horizontally extending rows of shingles or other building elements. It is appreciated that the rows can be staggered relative to a preceding row or not. Furthermore, the covering section 36 can simulate any other types of building elements such as wood planks, tiles, bricks, stones, and the like.

The panels can be made of any suitable material such as synthetic polymeric materials. It is appreciated that alternative embodiments can include any number of simulated building elements disposed in number of rows. Furthermore, the length and the height of the panels can be varied in accordance with the user's needs. In an embodiment, the panel can be integrally molded without the necessity of separate attachment, such as welding.

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the spirit or central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind without significantly departing from the spirit of the invention. The scope of the invention is therefore intended to be limited solely by the scope of the appended claims.

The invention claimed is:

1. A wall or roof covering for mounting on a support surface, comprising:
a plurality of panels securable to the support surface, each having a front surface including a covering section with simulated building elements, an opposed rear surface facing the support surface when secured thereto, an upper marginal edge region and an opposed lower marginal edge region overlying the upper marginal edge region of a vertically-adjacent panel, one of the upper marginal edge region and the lower marginal edge region having an inclined receiving slot defined therein, the other one of the upper marginal edge region and the lower marginal edge region having an inclined insertable flange engageable in the inclined receiving slot of the vertically-adjacent panel, wherein the inclined receiving slot and the inclined insertable flange extend at an angle ranging between 15 and 70 degrees with the support surface when mounted thereto in complementary orientations.

2. A wall or roof covering as claimed in claim 1, wherein each one of the panels comprises an inclined wall flange defining the inclined receiving slot and extending outwardly and downwardly from the front surface in the upper marginal edge region and the inclined insertable flange extends outwardly and upwardly from the rear surface in the lower marginal edge region.

3. A wall or roof covering as claimed in claim 1, wherein the inclined flange and the inclined slot are continuous along a length of each one of the panels.

4. A wall or roof covering as claimed in claim 1, wherein the upper marginal edge region of each one of the panels comprises a fastening strip juxtaposable to the support surface and the covering section being spaced apart from the support surface when the panel is mounted to the support surface, the covering section and the fastening strip being connected through an inclined connecting wall extending substantially parallel to one of the inclined insertable flange and the inclined receiving slot.

5. A wall or roof covering as claimed in claim 4, wherein the inclined connecting wall is discontinuous along a length of each one of the panels and comprises spaced-apart inclined wall sections extending from an upper edge of the covering section to a lower edge of the fastening strip, and interlocking ledges extending between two longitudinally-adjacent inclined wall sections.

6. A wall or roof covering as claimed in claim 1, wherein the lower marginal edge region comprises a lower ledge extending rearwardly from a lower edge of the covering section, each one of the panels comprises an inclined wall flange defining the inclined receiving slot, and one of the inclined wall flange and the inclined insertable flange extends upwardly and rearwardly from the junction of the rear face and the lower ledge.

7. A wall or roof covering as claimed in claim 1, wherein the inclined receiving slot has a width which corresponds substantially to a thickness of the inclined insertable flange.

8. A wall or roof covering as claimed in claim 1, wherein the inclined receiving slot and the inclined insertable flange extend at an angle ranging between 30 and 65 degrees with the support surface when mounted thereto in complementary orientations.

9. A wall or roof covering panel for mounting on a support surface, comprising:
a front surface including a covering section with simulated building elements;
an opposed rear surface facing the support surface when secured thereto;
an upper marginal edge region and an opposed lower marginal edge region overlying the upper marginal edge region of a vertically-adjacent panel, the upper marginal edge region having a protruding and inclined flange extending outwardly and downwardly from the front surface and the lower marginal edge region having a protruding and inclined flange extending outwardly and upwardly from the rear surface, one of the upper marginal edge region and the lower marginal edge region having an inclined wall extending parallel to the protruding and inclined flange and defining therewith an inclined receiving slot, the protruding and inclined flange of the other one of the upper marginal edge region and the lower marginal edge region being engageable in the inclined receiving slot of the vertically-adjacent panel, wherein the inclined receiving slot and the inclined flange insertable therein extend at an angle ranging between 15 and 70 degrees with the support surface when mounted thereto in complementary orientations.

10. A wall or roof covering panel as claimed in claim 9, wherein the inclined flange and the inclined receiving slot are continuous along a length of the panel.

11. A wall or roof covering panel as claimed in claim 9, wherein the upper marginal edge region of the panel comprises a fastening strip juxtaposable to the support surface and the covering section being spaced apart from the support surface when the panel is mounted to the support surface, the covering section and the fastening strip being connected through an inclined connecting wall extending substantially parallel to the inclined flange of the upper marginal edge region.

12. A wall or roof covering panel as claimed in claim 11, wherein the inclined connecting wall is discontinuous along a length of the panel and comprises spaced-apart inclined wall sections extending from an upper edge of the covering section to a lower edge of the fastening strip, and interlocking ledges extending between two longitudinally-adjacent inclined wall sections.

13. A wall or roof covering panel as claimed in claim 9, wherein the inclined receiving slot has a width which corresponds substantially to a thickness of the inclined flange insertable therein.

14. A wall or roof covering panel as claimed in claim 9, wherein the inclined receiving slot and the inclined flange insertable therein extend at an angle ranging between 30 and 65 degrees with the support surface when mounted thereto in complementary orientations.

15. A wall or roof covering for mounting on a support surface, comprising:
a plurality of panels securable to the support surface, each having a front surface including a covering section with simulated building elements, an opposed rear surface facing the support surface when secured thereto, an upper marginal edge region and an opposed lower marginal edge region overlying the upper marginal edge region of a vertically-adjacent panel, the upper marginal edge region having a protruding flange extending outwardly and downwardly from the front surface and the lower marginal edge region having a protruding flange extending outwardly and upwardly from the rear surface, one of the upper marginal edge region and the lower marginal edge region having a longitudinally extending wall including longitudinally spaced apart wall sections and interlocking ledges extending between two longitudinally-adjacent wall sections, the longitudinally spaced apart wall sections extending parallel to the protruding flange of the same edge region and defining therewith a receiving slot, the protruding flange of the other one of the upper marginal edge region and the lower marginal edge region being engageable in the receiving slot of the vertically-adjacent panel and having at least one protuberance abutting at least one of the interlocking ledges of the vertically-adjacent panel upon engagement of one of the protruding flange in the receiving slot of the vertically-adjacent panel and securing overlying upper and lower marginal edge regions of vertically adjacent panels, wherein the receiving slot and the protruding flange engageable therein extend at an angle ranging between 15 and 70 degrees with the support surface when mounted thereto in complementary orientations.

16. A wall or roof covering as claimed in claim 15, wherein the at least one protuberance is wedge-shaped.

17. A wall or roof covering as claimed in claim 15, wherein the at least one protuberance is located on the protruding flange located in the lower marginal edge region and the at least one protuberance is located in the upper marginal edge region.

18. A method for manufacturing a wall or roof covering panel having a simulated building elements on a surface thereon for mounting on a support surface, the method comprising:
mechanically creating a first pattern in a mold which corresponds to a first texture;
chemically creating a second pattern in a mold which corresponds to a second texture; and then
molding the covering panel in the mold including the first and the second patterns to obtain the covering panel having the first texture and the second texture, wherein at least a section of the first and the second patterns are superposed to one another.

19. A method as claimed in claim 18, wherein the first texture comprises coarse components and the second texture comprises refined components.

20. A method as claimed in claim 18, wherein the first pattern is created in the mold before the second pattern.

21. A method as claimed in claim 18, wherein the first pattern is created by at least one of a machining process and an electroerosion process.

22. A method as claimed in claim 18, wherein chemically creating the second pattern comprises applying a protection pattern over the mold, and dipping the mold in an acid bath.

23. A method as claimed in claim 18, wherein the mold comprises an injection mold and the covering panel is molded by an injection molding process.

24. A mold for manufacturing wall or roof covering panels having a simulated building elements on a surface thereon, the mold comprising:
a mechanically created pattern which corresponds to a first texture and a chemically created pattern which corresponds to a second texture, wherein at least a section of the first and the second patterns are superposed to one another.

* * * * *